T. E. LEWIS.
MOTION CONVERTING DEVICE.
APPLICATION FILED AUG. 7, 1916. RENEWED OCT. 11, 1918.
1,336,847. Patented Apr. 13, 1920.
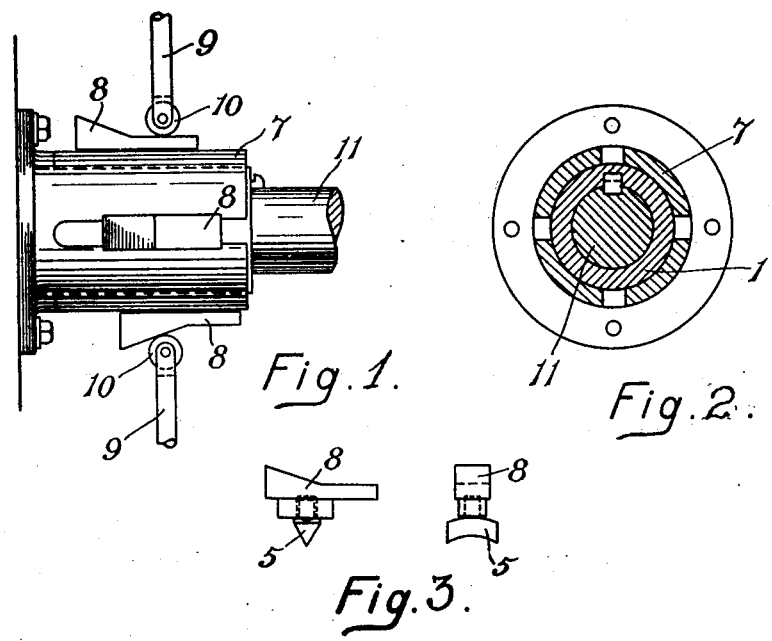

UNITED STATES PATENT OFFICE.

THOMAS EDGAR LEWIS, OF RHONDDA, WALES.

MOTION-CONVERTING DEVICE.

1,336,847.  Specification of Letters Patent.  Patented Apr. 13, 1920.

Application filed August 7, 1916, Serial No. 113,654. Renewed October 11, 1918. Serial No. 257,791.

*To all whom it may concern:*

Be it known that I, THOMAS EDGAR LEWIS, a subject of His Majesty, the King of Great Britain, and a resident of Rhondda, South Wales, have invented certain new and useful Improvements in Motion-Converting Devices, of which the following is a specification.

This invention is an improved device for converting rotary motion into reciprocating motion, or vice versa, and consists in providing a stationary sleeve in which slots are cut, and in which slippers or other devices formed with cams on their outside ends are adapted to slide, the whole surrounding a cylinder upon which is cut a cam path of the form mentioned above as consisting of right and left handed screw threads essentially of V form cut one upon the other. In practice the slippers or other devices receive a to and fro sliding motion by means of their coöperation with the cam thread or path, and consequently the cams formed on the outside of said slippers receive a corresponding to and fro movement, and are so formed that by means of this movement they impart a reciprocating motion to the actuating rods adapted to coöperate with said cams.

My invention is illustrated in the accompanying drawings wherein:

Figure 1 is an elevation of a converting motion mechanism constructed and arranged in accordance with my invention.

Fig. 2 is an end sectional view thereof, and

Fig. 3 shows side elevation and end views of the wedges or cams employed in the device shown in Figs. 1 and 2 in conjunction with the thread engaging slippers.

Referring to the drawings I show by way of example how this invention may be employed as a two to one gear to operate the valves of a four cylinder four cycle engine. In this case the sleeve 7 is provided with four slots in each of which a valve actuating cam 8 is mounted to slide, these valve actuating cams being connected to slippers 5. The numeral 9 designates the valve actuation rods which may be provided at their lower ends with rollers 10.

The rotatable member 1 is keyed upon the engine shaft 11, and as it rotates the valve actuation cams are caused to reciprocate in line with the shaft backward and forward once in each two revolutions of the shaft 11. Thus each valve will be operated once in each two revolutions and if the cams 8 are properly located the valves of the four cylinders will be actuated in proper sequence. The cams need not of course directly operate the valves, but may operate pivoted levers or other devices associated with the valves. Further, any number of valves or other devices may be actuated, the only limit being that imposed by the circumference of the sleeve 7, each valve requiring a slot and cam device. It will be seen that by means of my invention any desired ratio between the revolutions of the shaft and the reciprocation of the sleeve can be obtained and it will be understood that I do not confine myself to the precise arrangements shown and described by way of example but may make any variations desired within the scope of my claims. Moreover my invention may be found useful for many machines other than engines and for many purposes other than valve actuation.

What I claim and desire to secure by Letters Patent is:—

1. A device for converting rotary motion on a shaft into reciprocating motion comprising a rotating member, a stationary sleeve provided with slots, slidable cams rotated in each slot of said sleeve, and a slipper or slippers essentially of V-section connected to each cam and engaging in threads of V-form cut in the member rotating within the sleeve.

2. A motion converter comprising a rotatable shaft formed with a groove, slippers adapted to engage said groove, cams mounted upon such slippers and actuating rods adapted to bear against such cams.

In testimony whereof I affix my signature in presence of two witnesses.

THOMAS EDGAR LEWIS.

Witnesses:
FREDK. LEWIS,
FLORENCE H. LITTLE.